United States Patent

Rehhausser et al.

[15] 3,665,421

[45] May 23, 1972

[54] INFORMATION PROCESSING SYSTEM IMPLEMENTING PROGRAM STRUCTURES COMMON TO HIGHER LEVEL PROGRAM LANGUAGES

[72] Inventors: Frederick V. Rehhausser, Malvern; Elmer Dean Earnest, Dowingtown; Robert V. Bock, Malvern; Frederick H. Gerbstadt, Berwyn; James J. Monek, Exton, all of Pa.

[73] Assignee: Burroughs Corporation, Detroit, Mich.

[22] Filed: Nov. 28, 1969

[21] Appl. No.: 880,536

[52] U.S. Cl. ..........................................................340/172.5

[51] Int. Cl. ..........................................................G06f 15/16

[58] Field of Search ..............................................340/172.5

[56] References Cited

UNITED STATES PATENTS

| | | | |
|---|---|---|---|
| 3,350,693 | 10/1967 | Foulger et al. | 340/172.5 |
| 3,359,544 | 12/1967 | Macon et al. | 340/172.5 |
| 3,412,382 | 11/1968 | Couleur et al. | 340/172.5 |
| 3,487,370 | 12/1969 | Goshorn et al. | 340/172.5 |
| 3,461,434 | 8/1969 | Barton et al. | 340/172.5 |
| 3,546,677 | 12/1970 | Barton et al. | 340/172.5 |
| 3,548,384 | 12/1970 | Barton et al. | 340/172.5 |

*Primary Examiner*—Paul J. Henon
*Assistant Examiner*—Ronald F. Chapuran
*Attorney*—Mervyn L. Young, Paul W. Fish and Charles S. Hall

[57] ABSTRACT

This disclosure relates to an information processing system adapted to implement functions common to many higher level programming languages which functions require information structures to be variable in length and size. Each processor in this multiprocessing system contains various structure buffers to manage different process or program structures that are nested to provide a hierarchy of processes and subprocesses. The structure buffers include resource stack buffers that reference resources available to a currently allocated process including a description of that process environment that in turn references control information for currently executed routines. Buffers are also provided to the various process name stacks that describe parameters and operands required and also for the value stacks which hold such operands.

The structure buffers are addressed through an associative memory to allow for the searching of the buffers for often used entries.

10 Claims, 12 Drawing Figures

INVENTORS.
FREDERICK V. REHHAUSSER
E. DEAN EARNEST
ROBERT V. BOCK
FREDERICK H. GERBSTADT
JAMES J. MONEK
BY [signature]
ATTORNEY INVENTORS.
FREDERICK V. REHHAUSSER
E. DEAN EARNEST
ROBERT V. BOCK
FREDERICK H. GERBSTADT
JAMES J. MONEK
BY [signature]
ATTORNEY

INFORMATION PROCESSING SYSTEM IMPLEMENTING PROGRAM STRUCTURES COMMON TO HIGHER LEVEL PROGRAM LANGUAGES

This invention relates to an information processing system and more importantly to such a system which implements functions and data structures which are common to many higher level programming languages.

BACKGROUND OF THE INVENTION

Large scale data processing systems find many applications for multi-programming including concurrent batch processing, real time processing and time sharing. In order to accommodate a number of such unrelated jobs or tasks, prior art systems have been provided with operating systems or control programs which supervise such activities as task sequencing, storage allocation, and the like. Also included in the operating system are the various compilers or language translators which allow the programmer to employ different programming languages that do not require knowledge of the circuit characteristics of the system. It will be appreciated that the type of tasks for which the machine is to be used will affect the operating system which in turn affects the design of the system itself. If the machine is designed to be job oriented then the supervisory program is geared to execute an incoming stream of programs and its associated input data. On the other hand, if the machine is designed for real-time or time sharing operations, the supervisory program views incoming pieces of data as being required to be routed to the number of processing programs. When the machine is designed for time sharing, then protection of different programs and related resources becomes important.

Although a single processor system may be multi-programmed, a greater degree of flexibility is achieved from a multi-processing system where a number of separate processes may be assigned to a plurality of processors. Examples of such multi-processing systems are disclosed in the Anderson et al. U.S. Pat. No. 3,419,849 and Lynch et al. U.S. Pat. No. 3,411,139. A central processor of the type employed in the Lynch et al. patent is disclosed in Barnes et al. U.S. Pat. No. 3,401,376. Each of the above mentioned patents is assigned to the assignee of the present invention.

The above described systems employ operating systems which were designed for multi-processing systems. A particular distinction of the present invention is that the processor module employs circuitry to evaluate system instructions at a faster speed than previously accomplished. More importantly, the operating system of the present invention and the circuitry adapted to implement that system are designed to provide an architecture to more readily accommodate multi-task processing including time sharing applications as well as real time applications and batch data processing.

It is particularly advantageous to have system programs such as service programs which are recursive or reentrant out in nature. Furthermore, it is advantageous that such recursiveness exists in a hierarchy of levels and not just one level. Furthermore, it is advantageous and even necessary that certain of the system programs as well as the user programs be protected in memory from unwarrented entry by unrelated processes being carried out elsewhere in the system. Still another characteristic which is advantageous is that of providing functions common to various source languages which functions are implemented in circuitry where possible to provide faster execution times.

Various programming languages or source languages have been devised which allow the user to write programs without specific knowledge of the machine language which the system employs. Among the various programming languages which have been devised are Fortran, Cobol, Algol and PL/1. A particular problem in devising compilers or translators for the source languages is that of a difference not only in the type of operators to be employed but also in their instruction formats as well as in the data structures involved. Such structural format differences and operator requirements occur in part because of the different memory organizations that are designed for different processing systems. Thus, if one system were particularly adaptable for employing a particular programming language, it would not necessarily be as readily adaptable for another programming language. Therefore, it would be desirable to have a memory organization which is free of any internal structure and which can accommodate data and instruction segments of an almost infinite variety of sizes. Not only does such a structure free memory accommodate different sized information segments, but it also allows for greater data compaction.

It is impractical to build a completely bit addressable memory, and memories are designed to be word or byte oriented. Prior art memories have been designed to be able to store and fetch to or from any selected byte location in a word oriented memory. However, this still does not allow for selection of a field of any size larger or smaller than a byte, which field can start at any selected bit location. This is particularly advantageous in accommodating different problem solutions for which various program languages and data formats have been designed.

Another feature employed by prior art systems has been that of either providing circuitry for particular functions for which a program language has been devised. However, systems designed to handle certain types of problem solutions are not readily adaptable to handle other types of problem solutions. In a system where functions common to many program languages have been mechanized, faster execution times and compile times are achieved.

It is therefore an object of the present invention to provide an improved multi-processing system for such diverse applications as time sharing, scientific problem solving and other data processing tasks.

It is still another object of the present invention to provide an improved multi-processing system that can handle complex data structures which may be both nested and composed of variable type and length elements.

It is still another object of the present invention to provide a multi-processing system that may readily accommodate the sophisticated programs structures dictated by present and future source languages.

RELATED U.S. PATENT APPLICATIONS

U.S. patent applications directly or indirectly related to the subject application are the following:

Ser. No. 880,537 filed Nov. 28, 1969, by R. V. Back, et al. and titled "Information Processing System Having Means for Dynamic Memory Address Preparation,"

Ser. No. 880,535 filed Nov. 28, 1969, by A. J. DeSantis, et al. and titled "Information Processing System Having Free Field Storage for Nested Processes,"

Ser. No. 9,275 filed Feb. 6, 1970, by J. C. Trost, et al. and titled "Autonomous Multiple-Path Input/Output Control System."

SUMMARY OF THE INVENTION

Since different higher level program languages differ not only in the type of operators to be employed but also in their instruction formats as well as in the data structures involved, a system must be able to manage variable information structures in order to accommodate a variety of such programming languages. The present invention is adapted to a multi-processing system that is provided with a free field storage with each processor in the system being able to dynamically prepare addresses to data structures starting at any memory bit location and having any length. This allows the system to manage a hierarchy of nested processes. To this end, the present invention is adapted to provide the necessary structure buffering to accommodate proper resource allocation and procedure return required by such a process hierarchy.

A feature, then, of the present invention resides in an information processing system having a processor to execute program strings and in structure buffers within said processor which reference resources including routines currently available to the process allocated to that processor.

More specifically, a feature of the present invention resides in the provision of structure buffers to reference the process environment of a routine currently being executed and including descriptions of values and operands to be employed. Such descriptions, or names as well as the values exist in stacks in memory. However, the processor is provided with buffer registers to contain the top of such stacks for ready access by the processor. The states of the name and value stack buffer registers are in turn referenced by information in contro buffer registers, which information is obtained from l field the resource stack buffer registers.

DESCRIPTION OF THE DRAWINGS

The above and other objects, advantages and features will become more readily apparent from a review of the following description in relation with the drawings wherein.

GENERAL DESCRIPTION OF THE SYSTEM

Multi-processing systems, as well as multi-programming systems, can be viewed as a series of related or unrelated programs, tasks or jobs which hereinafter will be called processes. An elementary process is a serial execution of operators by a single processor. A process may be partitioned into subprocesses or may be a part of a parent process. In this way a process hierarchy can be established. The term "process" may be defined as an association between a processor and address space. The address space is the set of all storage that is acceptable by that process. All the available storage space in the system can be viewed as holding a global process which is the ancestor of all other processes and subprocesses in the system. Such a global process can be viewed as including the entire operating system with supervisory programs, service programs and compilers as well as the various user programs.

The address space of the system of the present invention extends over all the levels of storage including the main store and a back up store as well as peripheral devices. This system is, of course, provided with a plurality of processors each of which is provided with a resource structure in memory to store the definition of a new work space or spaces. This resource structure, which will be described in more detail below, permits each processor to keep track of the relation between the entire global process space (the memory or storage) and the particular process space with which it is currently associated.

The process resource structure is the mechanism used to pass all resources between processes of the process hierarchy and, therefore, it is an integral part of the resource protection scheme as required for protection of different user programs during time sharing as well as for protection of the different processes in general. As a particular processor moves from a parent process to a subprocess, allocated resources are stacked in the processor's resource structure and are removed from the process resource structure when the processor moves from the subprocess back to the parent process. In this way, the resource structure contains all of the dynamically allocated resources which its processor might require for any particular subprocess. A particular system management process is the only process which may directly access entries into each of the resource structures.

Figure 1:
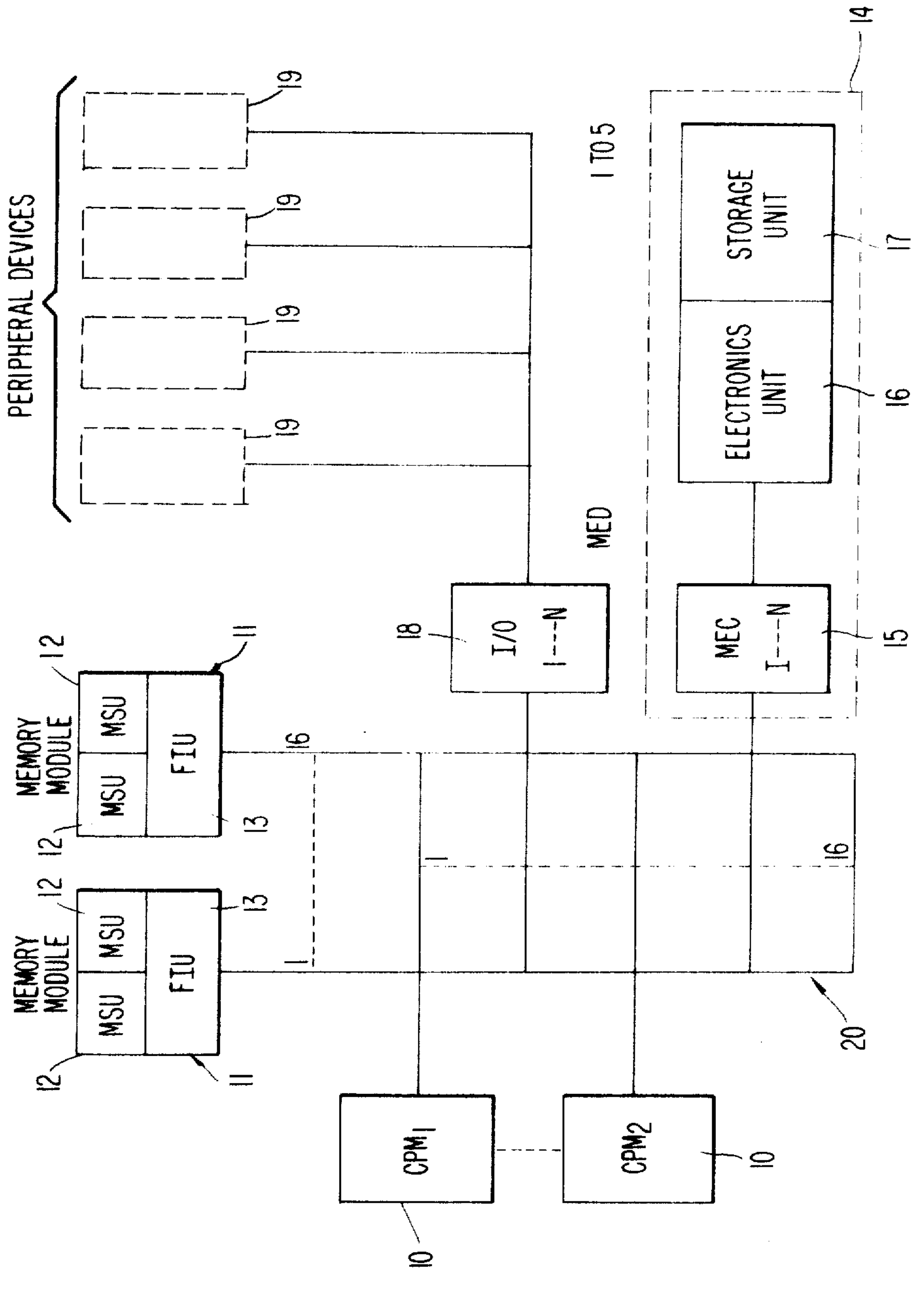
FIG. 1 is a schematic representation of a system of the type employing the present invention.

By generally describing the process architecture in the manner above, one has also generally described the manner in which the various levels of storage are employed. A brief description will now be given of the system of the present invention adapted to utilize such process architecture. Referring now to FIG. 1, there is shown therein a general representation of the type of system emboding the present invention. This system includes a plurality of central processor modules 10 and one or more I/O control modules 18 which along with back up memory 14 are connected to a plurality of memory modules 11 by way of a switch interlock 20. Each of the memory modules 11 is comprised of two memory storage units 12 and an isolation unit 13 the function of which will be more thoroughly described below. Back up memory 14 is comprised of memory extension controller 15 and a plurality of units 16 and 17 which may include registers, core storage or disc files. Back up memory 14 will hereinafter be referred to as level 2 memory. One or more of the I/O controllers 18 are employed to establish communication to the plurality of peripheral devices 19.

The organization as illustrated in FIG. 1 does not differ substantially from that disclosed in the above mentioned Lynch et al. U.S. Pat. No. 3,411,139. However, the system of the present invention does distinguish quite differently therefrom in the manner in which it employs the process hierarchy described above and in the manner in which the features of the present invention are adapted to employ that hierarchy.

The principle features of the present invention reside both in the manner in which the respective memory modules 12 are adapted to appear to the system as a free field storage and in the manner in which the respective processors 10 are adapted to utilize this storage to employ the process hierarchy described above.

Figure 2:
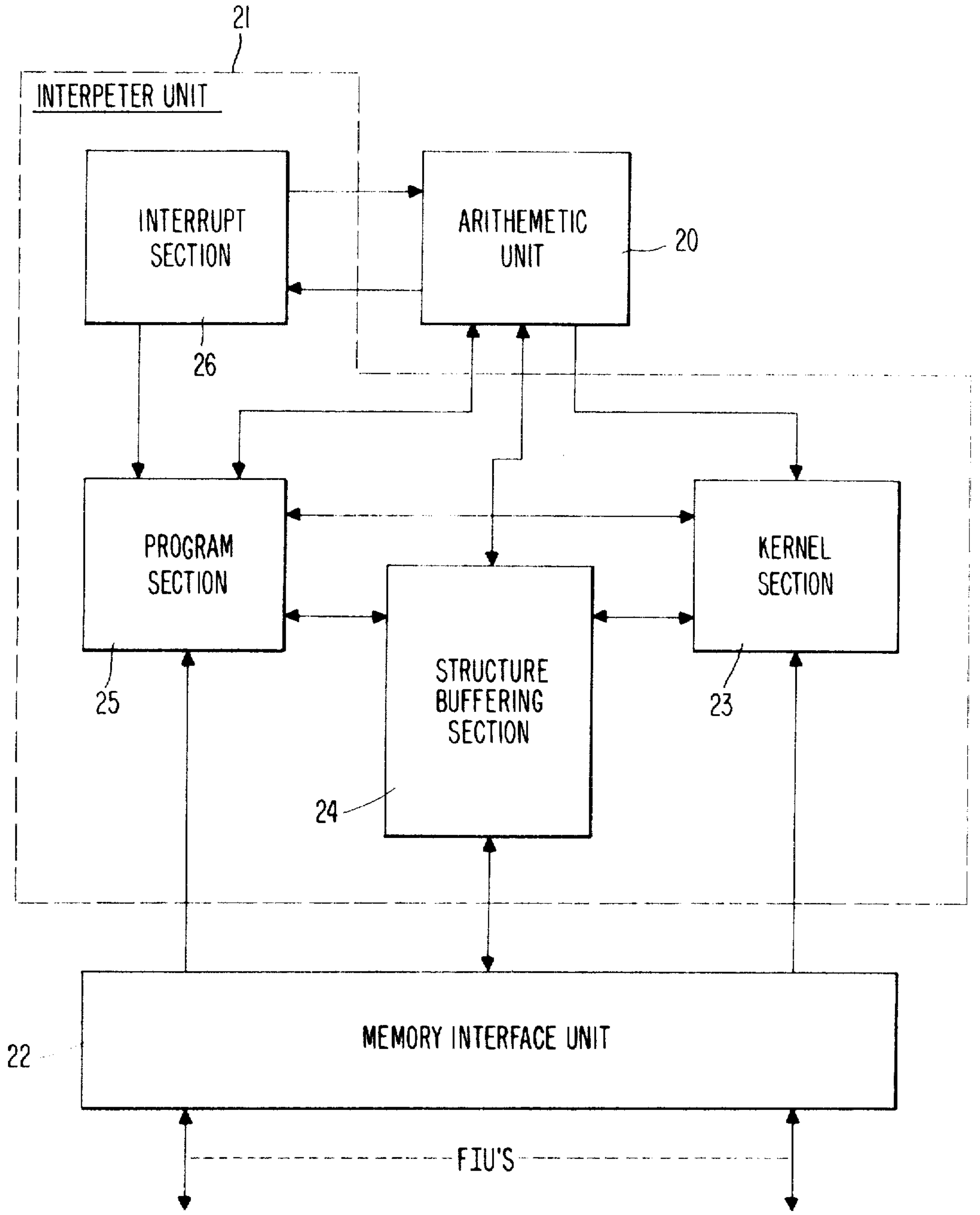
FIG. 2 is a schematic representation of a processor employed with the present invention.

The features of the processor will be first described generally in reference to FIG. 2. As illustrated in FIG. 2, interpreter unit 21 along with arithmetic unit 20 serve to form the system of processor 10 such as illustrated in FIG. 1. Memory interface unit 22 serves as the communications interface between interpreter 21 and the respective memory modules 11 of FIG. 1. Interpreter 21 is formed of four basic sections: kernel section 23, structure buffering section 24, program section 25 and interrupt section 26.

The main function of each processor 10 is to activate and deactivate processes, direct information transfers between modules, service interrupts and execute arithmetic calculations required by a program. These functions are performed under the direction of a master control program (MCP). The processor minimizes memory access times by utilizing phased fetches and stores where possible, and by associatively buffering information. Execution speeds are enhanced and hardware costs are minimized by the centralization of controls of the functionally independent subsection within the interpreter unit 21. Within each processor, it is interpreter 21 which controls the movement of program and data, provides automatic memory protection, responds to interrupts and controls, and empties and replenishes the various stacks and buffers within the processor.

Within the interpreter, program section 25, fetches, interprets and executes the program operators in the program string. Kernel section 23 fetches, interprets, executes and updates descriptors which are referred to by name in the program string according to the program operator being executed. Structure buffering section 24 consists of a set of local memories which buffer frequently accessed items in order to minimize level-1 (main store) fetches. The buffering is based on the structures used to define the processor. Interrupt section 26 receives interrupts and faults, examines them and passes the appropriate fault or interrupt signal to accomplish a change in program.

Interpreter unit 21, then, is designed to provide the processing control for the system by means of structure operators specifically designed for efficient management of data and program structures, and by means of program operators selected to allow easy implementation of higher level languages. The control information is distributed, as required, to the arithmetic unit and through the memory interface unit 22 to the memory module.

While the main memory or level-1 memory is adapted to appear to the system as being free field or without structure, the various processes and information segments stored therein will, of course, be structured. Descriptors are provided to designate or point to the various information structures in memory, and also describe such structures as well as their significance in relation to the process in which they reside or the the parent process if the structure itself is a subprocess.

Figure 4:
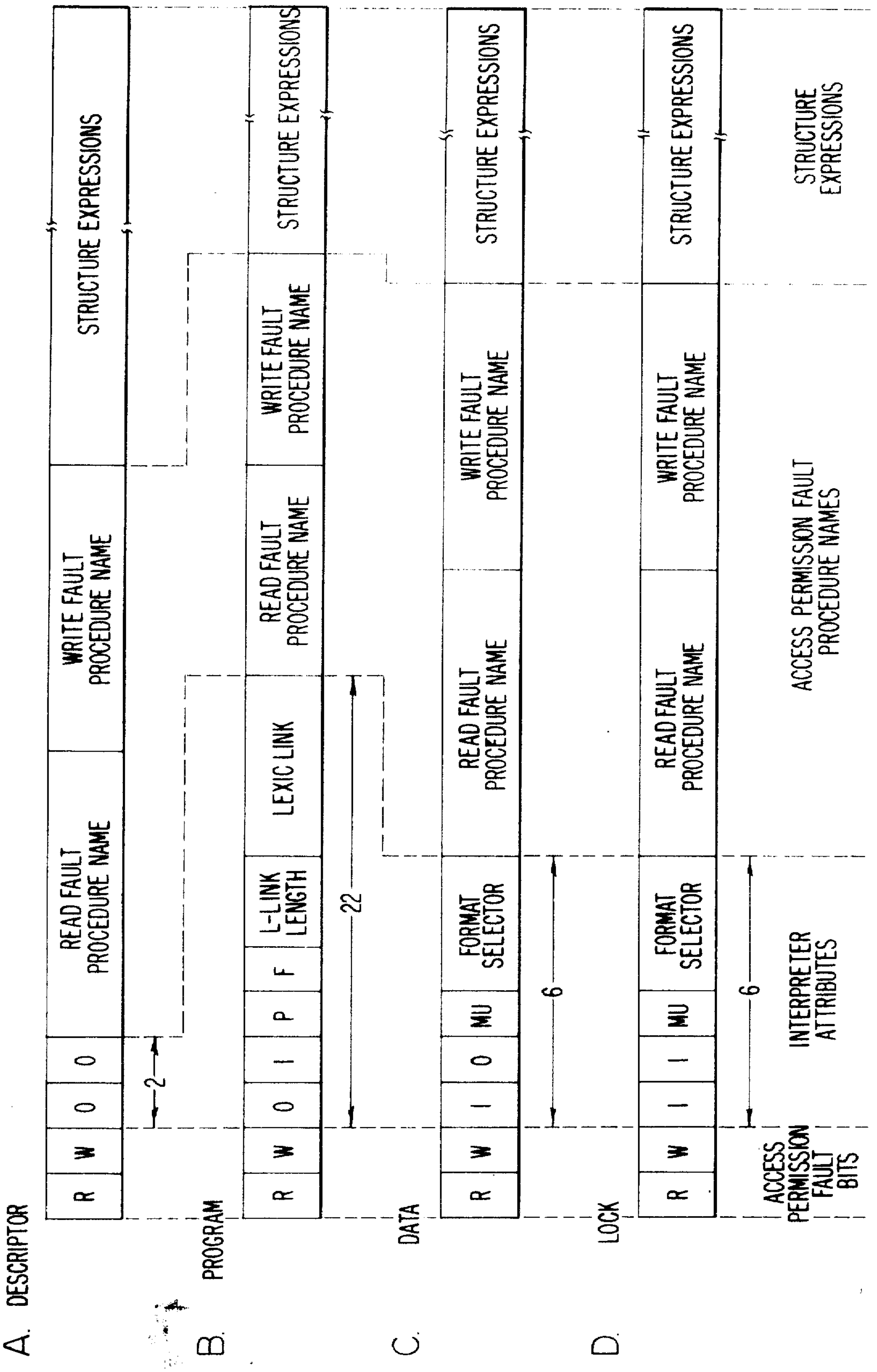
FIG. 4 is a representation of descriptor formats as employed with the present invention.

In this sense, accessing of all structured information in the various levels of memory involves and evaluation of descriptors which evaluation is performed by kernel section 23 as illustrated in FIG. 2. As illustrated in FIG. 4, there are four types of descriptor formats to respectively reference locked data fields, data objects, program segments or other descriptors.

Each of the descriptors contains three major information sets or expressions. These are referred to as the access attributes, interpreter attributes and structure expressions. The access attributes define protection capability and also specify whether an element refreenced in memory can be stored or fetched. The interpreter attributes define the characteristics of that refreenced element and the structure expression contains the type of structure within which the element resides and this defines the structure and structure parameter fields which give the parameters necessary for accessing that structure. It is to be noted in reference to FIG. 4, that each descriptor can contain as many structure expressions as are necessary to define a desired element.

Figure 5:
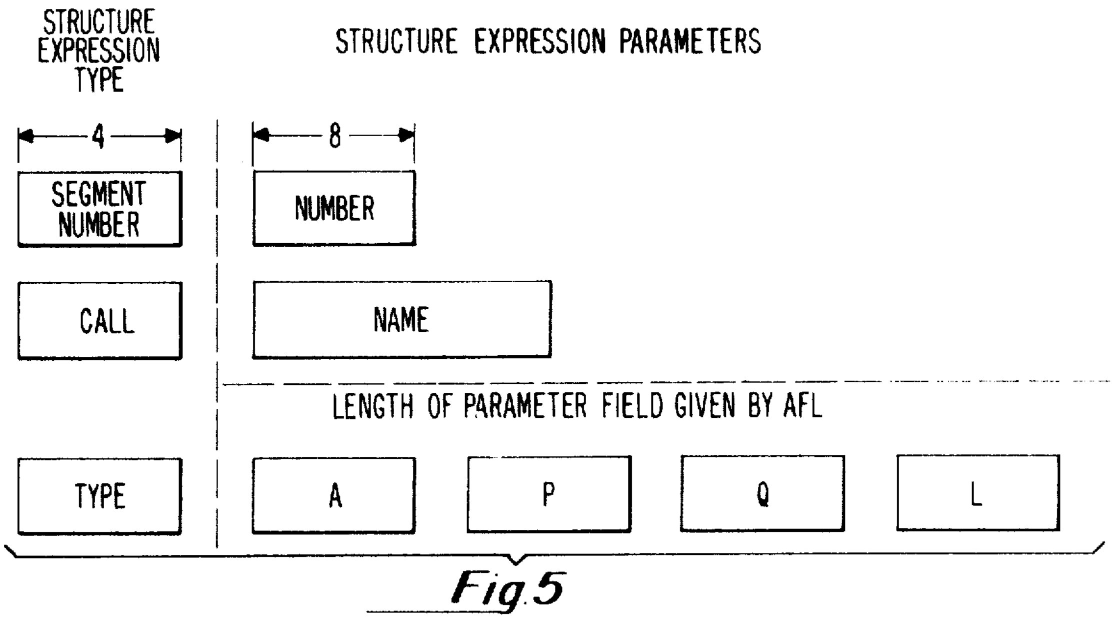
FIG. 5 is a representation of formats of structure expressions.
Figure 7:
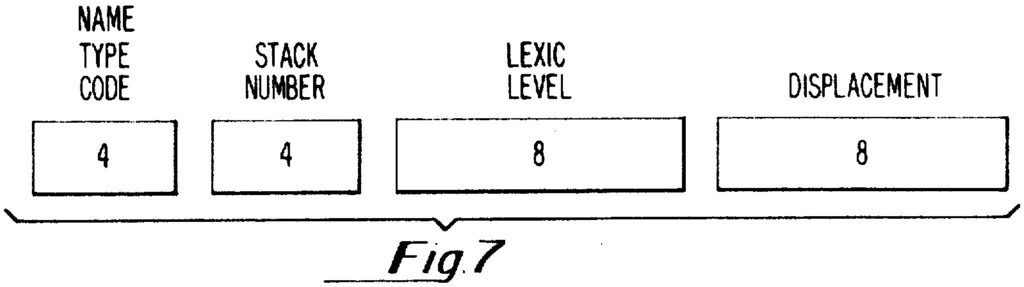
FIG. 7 is a representation of the name format.
Figure 6:
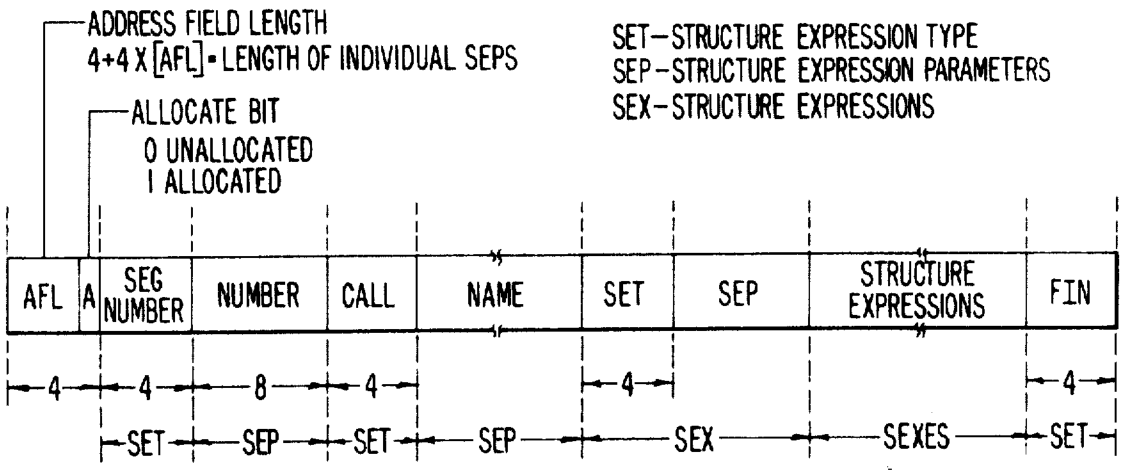
FIG. 6 is a representation of a string of structure expressions as might exist in a descriptor.

The formats of the structure expression field are illustrated in FIG. 5. In addition to the general format, two particular structure expression types are illustrated which are the segment number and the call expressions. These are the only two structure expressions which have predetermined size. The segment number always has an 8-bit index to access the resource stack as its parameter. The call expression always has a name as its parameter which is employed to reference descriptors. The descriptors, thus, have been generally described. It will be remembered that it is from the descriptor that a memory control word is created.

DETAILED DESCRIPTION OF THE INVENTION

A. Interpreter Kernel Section

Figure 3:
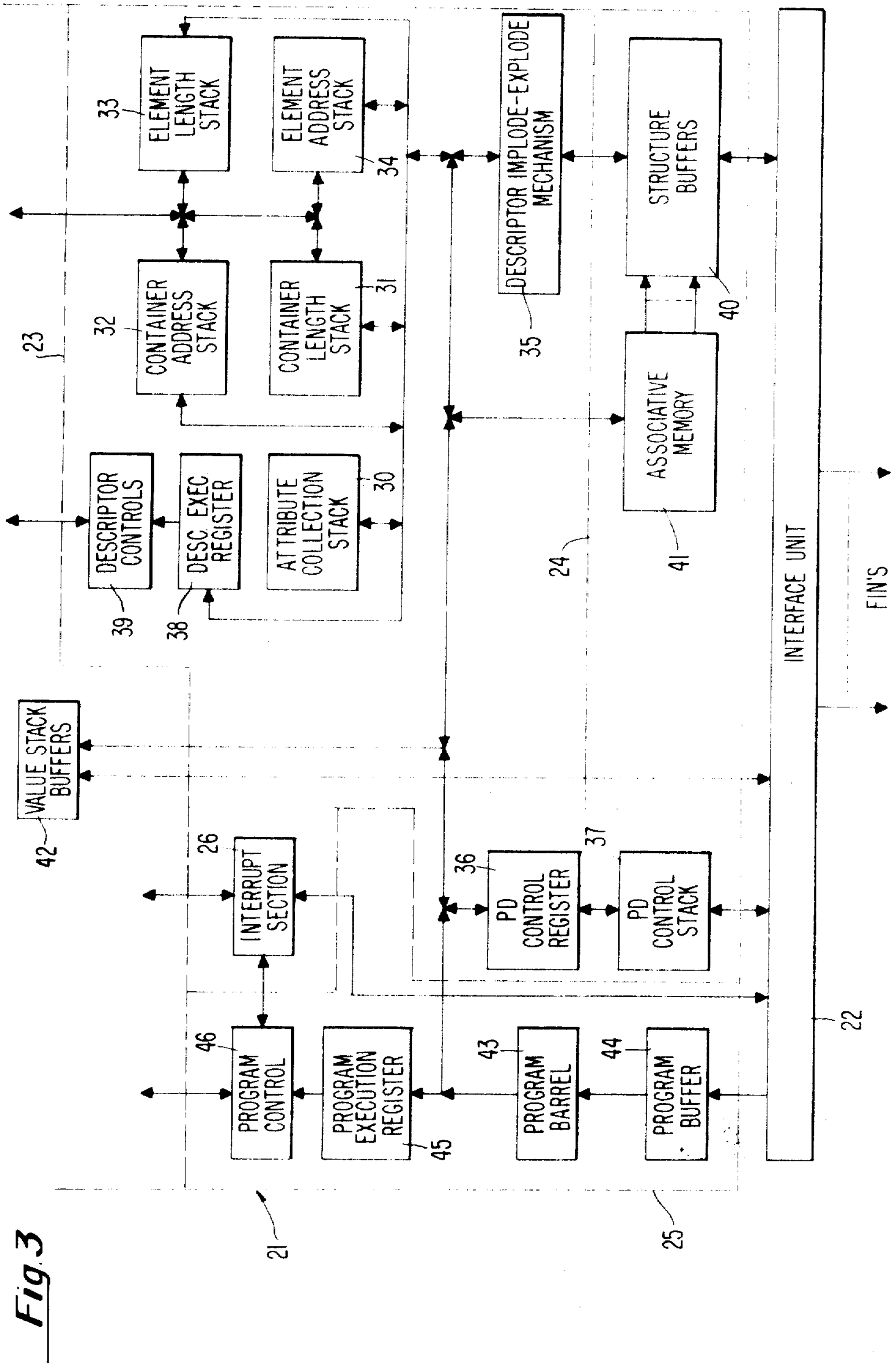
FIG. 3 is a schematic representation of the interpreter portion of the processor.

The reader is now referred to FIG. 3 which illustrates the circuitry employed by interpreter 21 and more specifically by kernel section 23 to evaluate the respective descriptors and structure operators. The kernel hardware includes five attribute stacks 30, . . . , 34; descriptor implode-explode mechanism 35; the program/descriptor control register 26; descriptor execution register 38 as well as descriptor controls 39 and program/descriptor control stack 37. Kernel section 23 receives data from structure buffers 40, value stack 42, program barrel circuit 43 and arithmetic unit 20 as illustrates in FIG. 2. Kernel section 23 sends data to structure buffers 40 and to arithmetic unit 20.

Evaluation of the various descriptors by kernel section 23 provides for the accessing of the various structured information in the respective levels of memory. The product of this evaluation is a reference which is referred to as the terminal descriptor. Particular element references in the structure depend upon the mode of evaluation of the descriptor and the evaluation parameters. The evaluation modes are those of enter, remove and construct and may be applied to all structures.

Evaluation begins with the execution of an evaluate operation which employs an empty terminal descriptor and a descriptor to be scanned by kernel section 23 during the evaluation operation. Each structure may refer to two fault procedures (one for read and one for write) determined during the evaluation if the fault procedure name is defined in the descriptor being scanned. This name is then moved to the terminal descriptor. The fault indicators are accordingly accumulated in the terminal descriptor.

The structure expression of the descriptor consists of an allocate bit followed by a sequence of structure instructions. If the allocate bit is false an immediate allocate fault occurs. Otherwise, the structure expression instructions are executed in order from left to right. Each instruction consists of an operation and a structure state.

The structure state contains address and length fields. The length of the fields in the structure state is specified by the address field length of the structure expression. The first instruction of the structure expression must define a segment number. This may be defined either explicitly with a segment instruction or with a call instruction of another structure which defines the segment number. The segment number is inserted into the segment instruction of the terminal descriptor.

Certain instructions may be mode-dependent and govern those structures in which allocation may occur. Accesses to mode-dependent instructions in the remove or enter mode will change the structure state for allocation or deallocation of an element respectively. Accesses to any structure in the construct mode have no effect on the structure state. In the case of mode-independent structures, enter and remove modes are equivalent to the construct mode. In structures with more than one mode-dependent instruction, the particular mode has the effect only on the first mode-dependent instruction. That is, if the structure has substructures in which allocation may occur, allocation can occur only in the innermost allocatable structure.

Each of the structures in memory can be thought of as being contained in address space defined by an address and a length. Thus, in the evaluation of structure expression, each instruction after the initial one in that expression operates on a container address in container address stack 32 of FIG. 3 and on container length in container length stack 31 in order to define a proper substructure within the container. A fault occurs if the subfield is not wholly contained in the container so defined. Unless otherwise specified, parameters required by certain instructions are found in the value stack which resides in memory and supplies values to value stack buffers 42 of FIG. 3.

In FIG. 3, attribute collection stack 30 then serves to collect access permission attributes, segment numbers and format selectors which are received from the various descriptors during evaluation. The other four stacks 31, . . . , 34 are used for structure expression parameter manipulation. Each stack consists of four words which are 32 bits long. The stacks interface with the arithmetic unit for all calculations. They also utilize and modify the structure expressions in the structure and descriptor buffer 40 and they receive parameters from the value stack by way of value stack buffers 42 and program barrel circuit 43. The stacks are manipulated individually. Two of the stacks hold container information (starting address and length) while the remaining two stacks hold element information (starting address and length). The respective stacks are so indicated in FIG. 3. During evaluation, the stacks will hold intermediate values of such containers for length information and self identifying structures. At the end of every structure type evaluation, the element stacks will be empty while the container stacks will have a partial reference to the object The partial reference is a container address and a length corresponding to the point up to which the descriptor has been evaluated.

Continuing with description of the other circuits in kernel section 23, description execution register 38 retains the current descriptor structure expression type field in order that it may be used with information from the interpreter control section in determining the algorithm that is to be used by descriptor control section 39 in evaluation of the current structure expression. In conformity with the structure expression format of FIG. 5, the structure expression type is four bits long and thus, descriptor execution register 38 is also four bits in length.

Descriptor implode-explode mechanism 35 serves two functions. It is used to unpack fields in the various descriptors and to present each field to its appropriate destination. It also is used to update and repack fields from the various sources and to update descriptors.

Program/descriptor control register 36 and program/descriptor control stack 37 make up the program/descriptor control structure. PD control register 36 (PDCR) is 106 bits long and control stack 37 (PDCS) is made up of eight word locations each of which is 106 bits long. Stack 37 is the link to level-1 memory. This structure retains both program execution and descriptor evaluation and descriptor history. Entry into a subroutine, procedure, function, or loop causes the program execution information in the PDCR to be pushed into the PDCS. The entry is then recorded in PDCR. A program branch replaces the present information in PDCR with a description of the branch. During descriptor evaluation, a structure expression of the type "call" causes the PDCR to be pushed into the PDCS. The call description is placed in the PDCR. Since the descriptor evaluation never changes program history, the descriptor evaluation history will always be on top of the program execution history in the PDCS.

Figure 8:
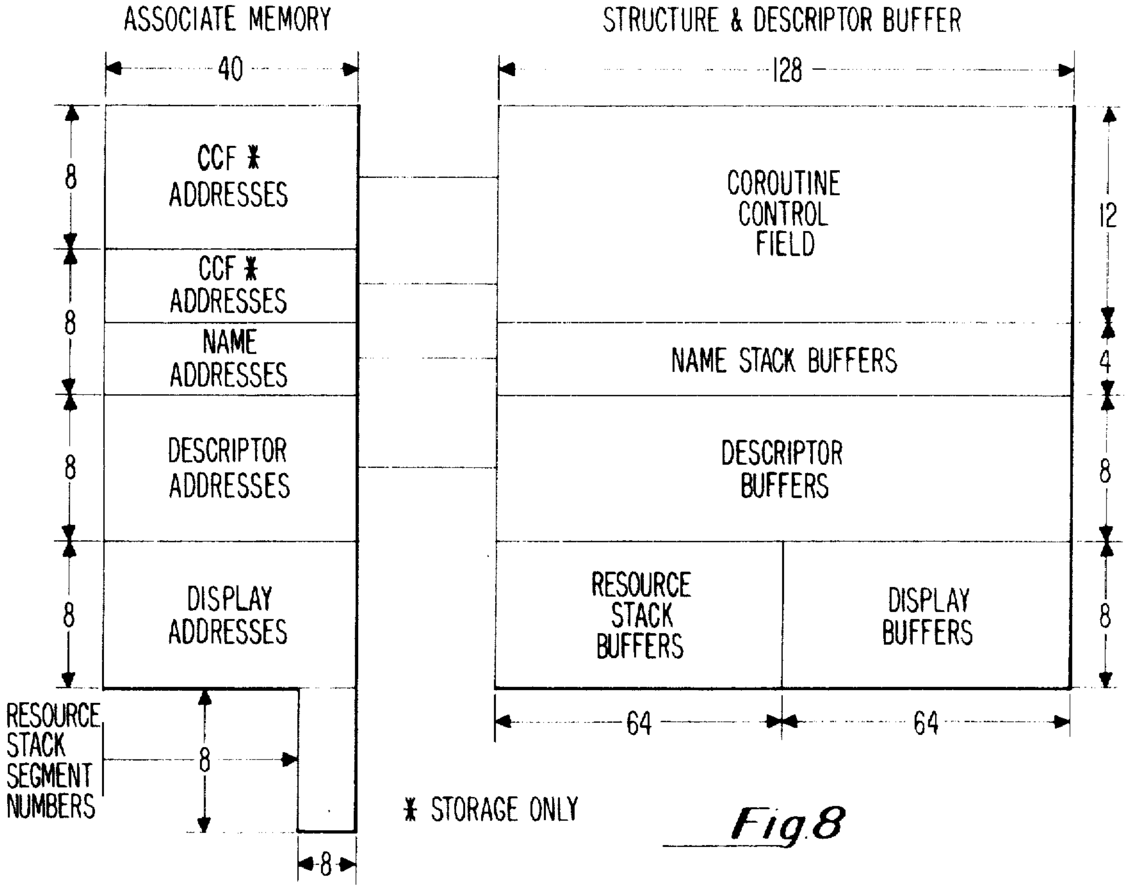
FIG. 8 is a representation of the organization of the structure buffers of FIG. 3.
Figure 11:
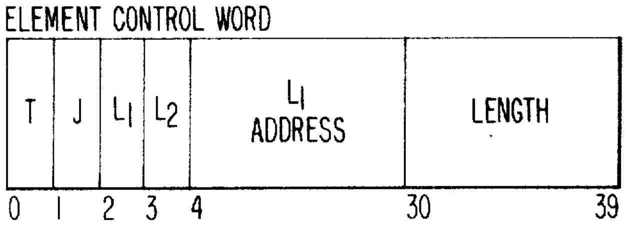
FIG. 11 is a representation of the element control word format.
Figure 12:
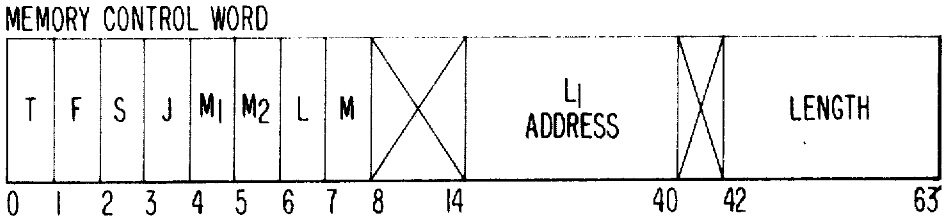
FIG. 12 is a representation of a memory control word format.

The structure and descriptor buffers 40 and associative memory 41 are not directly a part of kernel section 23 hardware. However, they provide the kernel section with the descriptors that are to be evaluated. The buffer is a 32-word by 128-bit local memory. The buffer is divided into five areas: coroutine control field buffer, name stack buffers, descriptor buffers, resource stack buffers, and display buffers. The descriptor resource stack and display buffers have an associative memory in order to quickly reference captured entries. The coroutine control field entries and name stack entries have their level-1 address stored in the associative memory for quick up-date. The organization of structure buffers 40 and associative memory 41 is illustrated in FIG. 8.

B. Interpreter Program Section

Having described the descriptor evaluation, program execution will now be described as performed by program section 25 of FIGS. 2 and 3. The program syllable currently being executed is pointed to by the contents of PD control register 36. This program syllable is a part of a program segment that is stored in the program buffer 44 which is a local associative memory. Program buffer 44 automatically refills itself when its senses that the program string will run out. Upon changes of direction in the program string caused either by procedure entry or branches, program buffer 44 is checked associatively to see if the beginning of the new program segment to be executed is already resident in program buffer 44. Nesting and unnesting of PD control register 36 for procedure entry and exit and loop control operators utilize PD control stack 37 which is another local memory. PD control stack 37 automatically links to level-1 memory for emptying and replenishing its contents.

Program operators are extracted from the program string by program barrel circuit 43 and placed in program execution register 45. Names (which were discussed above) are extracted from the program string by program barrel circuit 43 and placed into the attribute stack of structure buffers 40 for evaluation. Literals are extracted from the program string by program barrel circuit 43 and placed into value stack buffers 42 or name stack of structure buffers 40.

Figure 9:
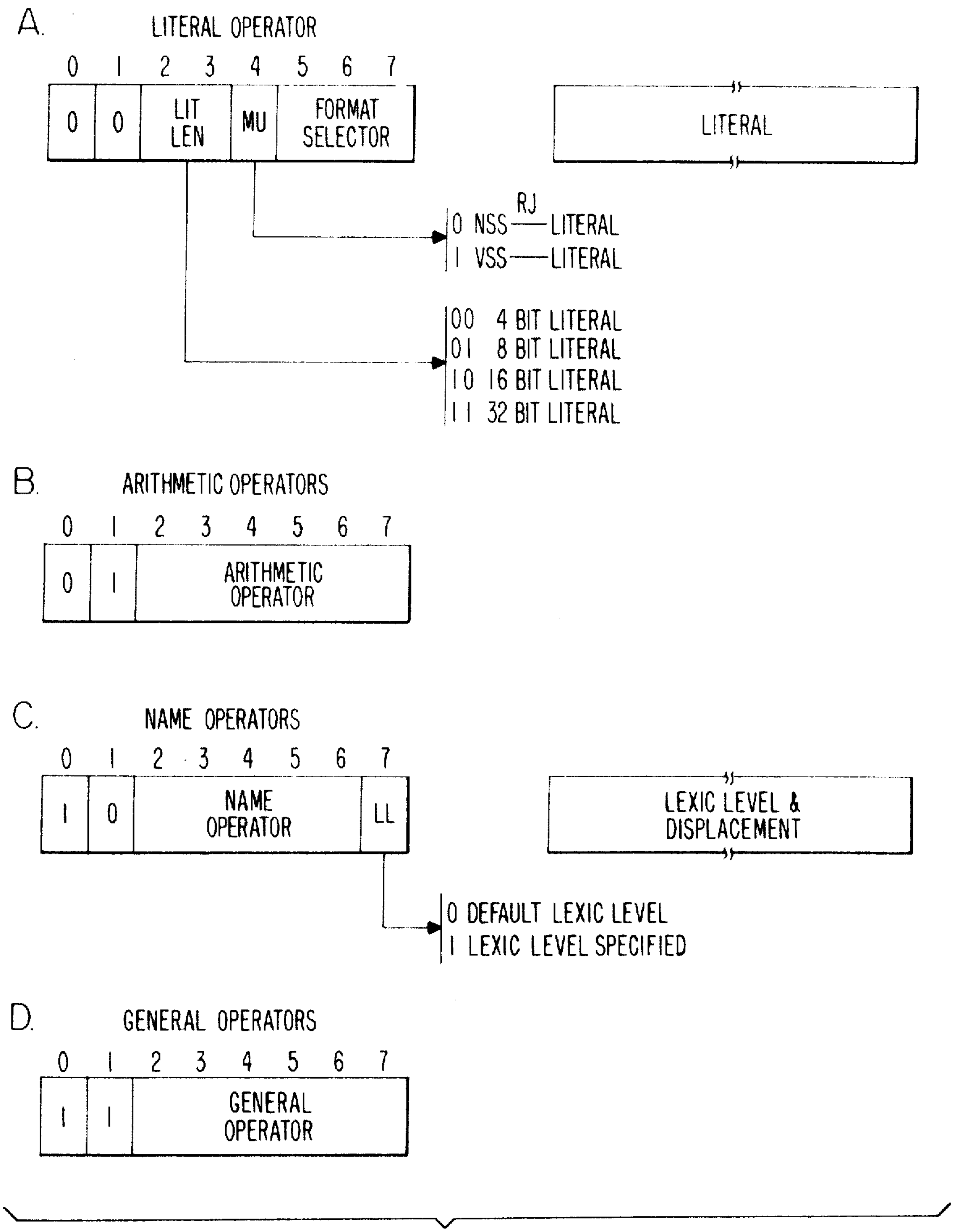
FIG. 9 is a representation of the program operator formats.

The respective program operators are of four general classes as illustrated in FIG. 9. These classes are: literal operators, arithmetic operators, name operators, and general operators.

As illustrated in FIG. 9, each class of operators starts with an 8-bit syllable. Literal and name operators can increase in 4-bit increments to a maximum syllable size of 32 bits for name operators and 40 bits for literal operators. The first two bits of the operation code define which class of operator the program syllable contains. If the program syllable contains a literal operator, the next two bits define the size of the literal. The literal may be 4, 8, 16 or 32 bits in length. The next 4-bit group of the literal syllable defines the destination and arithmetic format of the literal. The first bit of this group defines whether the literal is to be entered into the name stack or into the value stack. The remaining three bits contain the format selector which is used as an index to the arithmetic format vector. This selection gives the arithmetic format of the literal. The remainder of the program syllable contains the literal.

If the first two bits of the operation code define an arithmetic operator, the remaining six bits of the operator define the arithmetic operation to be performed. If the first two bits of the operation code define a name operator, then the next five bits define the operation to be performed. The remaining bits define whether the named object is contained in the top of the name stack slice and, then, the next eight bits give the displacement of the object within the slice.

The circuitry of program section 25 will now be described. Program buffer 44 serves to minimize main memory fetches by providing program strings to the processing module prior to initiating a memory fetch. The associated hardware of the program buffer 44 shall examine that buffer to determine if the branch address or contiguous program address resides in the program buffer. Buffer 44 shall have a maximum storage buffer capability of eight words each of which shall be 64 bits wide.

Program barrel circuit 43 performs the functions of alignment of inputs from program buffer 44, selection and isolation of an 8-bit operation code, selection and isolation of a variable length literal or name, and fan out of shifter outputs to all natural destinations. During alignment of inputs from program buffer 44, the inputs shall consist of two 64-bit words.

Program control 46 provides the decoding and encoding mechanism, control mechanisms and timing mechanisms that are needed to perform the respective functions required to be performed by program section 25. Such functions include a determination of the class of operators specified by the program syllable and also the determination of the literal size specified by the literal operator. Another function is the translation of a name specified by the name operator in a terminal reference. The program control 46 also determines the operation to be performed as specified by a name operator or a general operator. It further controls the passing of arithmetic operation field of the arithmetic operator to arithmetic unit 20 of FIG. 2. Still another function is to insure that the necessary processor environment is present prior to the execution of the program syllable. Program control 46 also interacts with interrupt section 26, the arithmetic controls (not shown) and descriptor controls 39 to insure that the proper subsequence of operations is performed.

Interrupt section 26 receives externally generated interrupts and externally or internally generated faults for examination of such faults in accordance with a programmable set of masks. Program section 25 shall be notified of interrupts and unmasked faults in order to accomplish changes in the program being executed. The appropriate interrupt or fault routine may be called. The interpreter interrupt section 26 shall also inform the program section 25 when a conditional halt situation is reached.

C. Interpreter Structure Buffers

Each processor module in the system of the present invention can be functionally described utilizing only those structures which the kernel section 23 can evaluate. This permits the processor structure to be defined as a structure residing in level-1 (main memory) storage. This, in essence, guarantees that the amount of local buffering used in the processor will not influence the functional operation of the machine.

The basic processor structures are the resource control structure, the procedure control structure, the coroutine control structure, and the program control structure. These structures provide all the mechanisms required to manage the respective levels of storage, allocation of processors and the internal control of coroutine and procedure entry and return.

The system of the present invention may be described as a set of resources available to a number of competing processes. The management and allocation of these resources is distributed over a set of control processes each of which manages some subset of processes. The distribution of resources in the various processes which are created and controlled by a particular process is through the resource control structure.

One and only one resource control structure exists for each processor in the system. As the processor moves from process space to process space, the structure keeps a history of the resources being passed. As a process is called, the subset of resources the caller wishes to pass are placed in the resource structure for use by the called process. The called process may use these resources but may not change them. When a subprocess returns to the process that activated it, the resources which have been allocated for that subprocess are removed from the resource structure.

The different resources that may be described by entries in the resource control structure include descriptions of segment containers in level-1 memory, descriptions of segment containers in level-2 memory, descriptions of level-3 storage (the various I/O devices), description of the processor time, description of the fault masks, and description of the fault and interrupt registers.

The resource structure provides protection against the illegal use of resources by a process and the changing of resources which do not belong to a given process. This is accomplished by having the resource control structure outside of the addressing space of all processes except the interpreter management process.

The procedure control structure is provided for controlling the allocation of level-1 storage or passing parameters to procedures and functions, for allocating storage for local variables used within procedures, functions, and blocks. Such a structure may be effectively used by a number of higher-level languages.

The procedure control structure consists of a stack for storing descriptions of the data structures used by a program, and of a display stack for controlling the particular descriptions which are currently visable to the program. The procedure control structure shall consist of three interrelated stacks: a name stack, display stack and value stack. Interrelation of these stacks is evident at procedure call and return when the addressing environment of the procedure must be established. The respective stacks reside in level-1 memory although buffers for these respective stacks exist in the structure buffering section 24 as described in relation to FIGS. 2, 3 and 8. The name stack contains the descriptions, parameters and locals required at various procedure, function and block levels. Slices are built in the name stack so that parameters and locals may be addressed by name. Each slice contains descriptions of parameters for a given procedure, function or descriptions of locals for a given block. Each slice is defined as a lexic level. A description of each slice is contained in the display stack. A typical name consists of a lexic level and displacement; that is, an index into the display stack that will locate the proper name stack slice and an index into the name stack slice will locate the proper description in the name stack. Slices can be created and destroyed by procedure operators or by procedure call and return. Entries in the name stack area between the top of the stack and the top most slice are used for expression evaluation. These entries are only addressable on a last-in first-out basis. The top four entries in the expression evaluation area may be buffered in a local memory for fast access.

As illustrated in FIG. 8, the name stack buffer is four words of 128 bits each. The buffer is dynamically controlled on a usage basis. The size of this memory restricts the width of the name stack to 128 bits.

The display stack contains descriptions of name stack slices. These descriptions are entered into the display stack by a procedure called or by the slice operator. These descriptions are removed from the display stack by procedure return or by the unslice operator. Each entry in the display stack that is accessed will be checked to see if it is captured in the local associative memory of the display stack. If it is not captured then this entry is fetched from level-1 memory and replaces the oldest entry in the local memory. As illustrated in FIG. 8, the display buffers of the local memory includes eight words of 64 bits each.

The value stack stores arithmetic operands that are about to be used or that are the result of a computation. Each entry in the value stack is referenced by a data descriptor in the name stack. Values may be explictly named. The name references a descriptor in the name stack. In turn this description defines the desired entry in the value stack. Arithmetic operators which require values cause the top of the name stack to be examined to see if it references a value. Program operators which affect the contents of the name stack will also affect the contents of the value stack if the name stack entry references the value stack.

The value stack has slices that are created and destroyed concurrently with the name stack slices. These slices contain operands, constants and partial results of program execution at various lexic-levels.

Any or all of the top four entries in the value stack may be captured in the value stack buffer 42 as illustrated in FIG. 3. Buffer 42 is a local memory of four words of 256 bits each. The word size of 256 bits limits the size of a single operand for an arithmetic operation. The value stack buffer links automatically to the value stack in level-1 memory.

The coroutine control structure controls all routines that can exist concurrently but must be run consectively. Each coroutine is defined by procedure control structure and a program control structure which are named in the stack of the current structure. Structure descriptors are in consecutive location in the name stack. This group of consecutive locations is referred to as the coroutine control field. This field for the routine currently being executed is contained in the descriptor buffer 40 as illustrated in FIGS. 3 and 8.

The coroutine structure is provided with a coroutine display description which shall reside in a fixed location in a process environment area. The coroutine display description defines the coroutine display which is a stack vector. The top entry in the coroutine display defines the active coroutine. The top entry shall contain a description of the parent's display and a name (i.e., lexic level and displacement) which, when applied to the parent display, finds the coroutine field of the active coroutine. The remaining entries in the coroutine display define the ancestry of active coroutines.

A coroutine can be evoked by a coroutine call operator. This operator has the name of the coroutine control field of the coroutine that is to be evoked. This name replaces the existing name in the top entry of the coroutine display. The hardware circuitry restores the coroutine control field of the existing coroutine into the name stack of the parent. The new coroutine control field is now captured in the descriptor buffer structure.

The coroutine activate operator establishes a new family of coroutines by placing a new entry in the top of the old coroutine display. The coroutine end operator removes the current family of coroutines by removing the top entry in the coroutine display. As indicated in FIG. 8, the coroutine control field buffer consists of a local memory of 12 words of 128 bits each and an associative memory of 12 words of 40 bits each.

The function of the coroutine control field buffer is to contain the control field of the current coroutine and the descriptions of the resource stack and the coroutine display. The descriptions are structure information that is referenced by the program operator, that is, the structures that are used by the program operators.

The associative memory 41 of FIG. 3 contains the level-1 address of each descriptor contained in the buffer in order that each up-dated descriptor can be restored quickly to level-1 storage.

Figure 10:
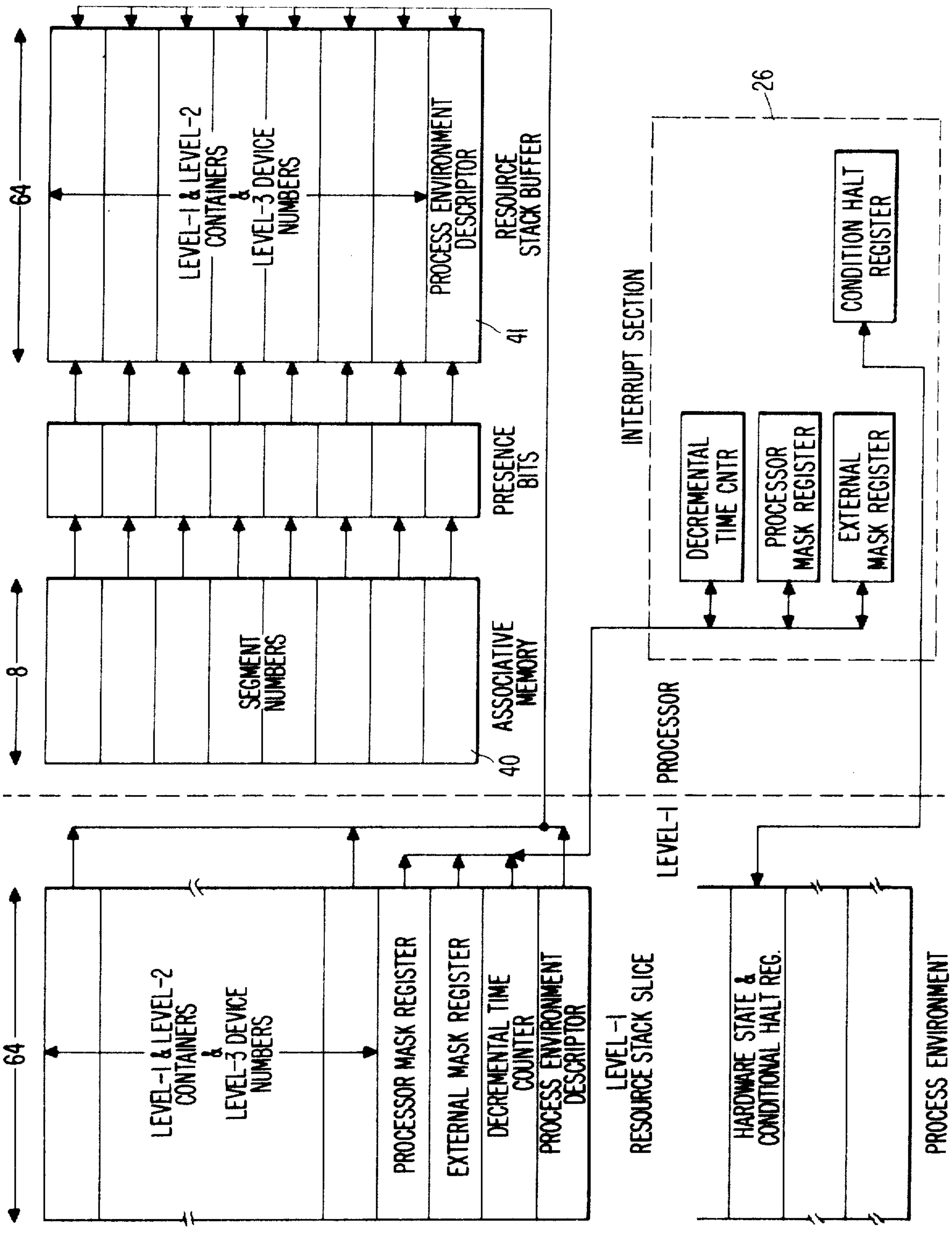
FIG. 10 is a schematic representation of information transfer between level-1 memory and the processor.

In order to illustrate the manner in which the contents of the various stacks are transferred to structure buffering section 24 of the processor, reference is now made to FIG. 10. As illustrated therein, the level-1 resource stack slice and process environment reside in main memory. The first entry in the resource stack slice contains the process environment descriptor which is then transferred to become the first entry in the resource stack buffer of structure buffer 40. The next three entries which contain the processor state information are placed in the appropriate registers in the interrupt section 26. These entries include the contents for processor mask register, external mask register and a decremental time counter.

The remaining entries which are level-1 containers, level-2 containers and level-3 device numbers are captured upon access in the resource stack portion of structure buffer 40. For each entry into buffer 40, there is a corresponding entry into the associative memory 41. The resource stack buffer in the process state is now set.

PROGRAM OPERATORS

The algorithms involved in the execution of the program operators will now be described. The classes of such operators which are relevant to the present invention include reference operators, descriptor operators, procedure control operators, coroutine operators and process call operators.

These operators were generally referred to in the above description of the Interpreter Structure Buffers. They are involved in the indexing and movement of various data structures between memory and the individual processors of the system. In addition to providing for the allocation of the individual processors, these operators also provide internal control in each processor for coroutines and procedure entry and return.

The reference operators are name, value, store and execute. The name operation evaluates the interpreter attribute. If the interpreter attribute is data, the descriptor is left in the top of the name stack. If the interpreter attribute is a program, a function call is made. The value operator evaluates the interpreter attributes. If the interpreter attribute is data, the data is fetched and entered in the value stack. If the interpreter attribute is a program, a procedure call is made. The store operator is also involved in the evaluation of interpreter attributes. If the attribute is a program, then a function call is made. A data descriptor is returned as a result of the function call. The format of the value is transformed to the format of the storage field. The value is then stored in the field pointed to by the data descriptor. The execute operator is employed to explicitly call procedures.

The descriptor operators are load, describe, allocate, bind, shorten and final combine. The load operator finds a descriptor in a name stack and copies it into the top of the name stack. The describe operator is employed to create a description from a name (i.e., converts the name into description). The operation sets the access attributes to a clear state and sets the interpreter attributes to a descriptor. The structure expression generated will be a field with the element address and length of the name passed to the described operator as a parameter. The allocate operator is employed to allocate space in an unallocated structure. The bind operator is employed to map an unallocated structure onto an allocated space. The shorten operator is employed to reduce the accessing path distance of a description. The shorten operator fetches the name descriptor and executes the first term of the structure expression that is not a segment number on the field and replaces that term with a derived field expression. The final combine operator is employed to calculate the absolute address of a structure.

The stack operators are duplicate, delete, exchange, value stack to name stack, and name stack to value stack. The function of the duplicate operator is to duplicate the top entry of the name stack; if the contents of the name stack slice segment contains a reference to a value stack slice segment, the contents of the value segment are also duplicated. The delete operator deletes the top entry above the name stack slice segment and also the contents of the value stack slice segment if it is referenced. The exchange operator exchanges the top two entries of the name stack and also the top two entries of the value stack if they are referenced in the name stack. The value stack to name stack operator removes the top entry of the value stack and enters in in the top of the name stack. The name stack to value stack operator takes the top entry of the name stack and enters it into the value stack and a reference to the new value stack entry replaces the original in the name stack.

The program control operators include loop, loop test, branch, branch conditional, halt and no operation. The loop operator causes a subroutine call on a named subprogram. The loop test operator is employed to determine if the end of the loop has been obtained. The branch operator evaluates the interpreter attribute of the descriptor in the name stack slice segment to determine the action to be taken. The branch conditional operator is employed to cause a change in program control when a specific condition exists. The halt operator is employed to provide a means for programmatically stopping a processor. The no operation operator causes the program control register to be updated and the next operator to be executed.

The procedure control operators are slice, unslice, and procedure return. The slice operator performs an entry into the value stack and deletes the reference obtained. It then performs an entry into the name stack and stores the reference in the top of the name stack and also in the next lexic level position in the display stack pointed to by the program control register lexic level field. The unslice operator performs the opposite operation as performed by the slice operator. The procedure return operator is employed to remove local variable slices in the name stack and the value stack.

The coroutine operators are coroutine activate, coroutine call and coroutine end. The coroutine activate operator is employed to establish a set of coroutines by entering the present display descriptor into the coroutine stack. The coroutine call operator returns the active coroutine control field to the location in the name stack and a new coroutine control field is fetched and placed in the descriptor buffer portion. Coroutine end is employed to return to a parent coroutine.

The process call operators are process parameter, process parameter indirect, process call and process end. The process parameter operator is employed to pass resources from the parent process to a subprocess. The process parameter indirect operator is employed to pass or to create references to external objects from a parent processor to a subprocess. Process call operator is employed to create a new resource stack slice. Process end operator is employed to remove a resource stack slice.

While particular embodiments of the present invention have been described and illustrated, it will be apparent to those skilled in the art that changes and modifications may be made therein without departure from the spirit and scope of the invention as claimed.

What is claimed is:

1. In an information processing system having a storage system for storing stacks of information including descriptors, and a processor to execute a string of program operators, said processor comprising:

a first plurality of buffer registers to receive a plurality of descriptors required by said program string;

a second plurality of buffer registers to receive, from said storage system, procedure descriptors referencing procedure sets of descriptors to be employed by the process currently being executed; and means responsive to the execution of program operators to search said second plurality of buffer registers for a procedure descriptor for the set of descriptors containing the descriptor called for by said program operator.

2. A processor according to claim 1 including:

a third plurality of buffer registers to receive descriptors to subsets of said descriptors which subset descriptors form base references for addressing individual descriptors in said storage system.

3. A processor according to claim 1 including:

a plurality of associative memory registers coupled to each of said first plurality of buffer registers to hold addressing indices for associatively addressing said first plurality of buffer registers.

4. A processor according to claim 1 including:

a fourth plurality of buffer registers to receive from said storage system descriptors which address procedures which may exist concurrently with but are to be executed separately from the current procedure.

5. A processor according to claim 1 including:

means responsive to the execution of a program operator calling for a descriptor to scan said first plurality of buffer registers for the presence of said called descriptor and to fetch said called descriptor from said storage system should said called descriptor not reside in said first plurality of buffer registers.

6. In an information processing system having a storage system for storing stacks of information, said stacks including value stacks of operands, name stacks of operand descriptors to address said operands, and stacks of descriptors referencing procedure sets of such name stacks of operand descriptors; a processor to execute a string of program operators, said processor comprising:

a first plurality of buffer registers to receive, from a name stack in said storage system, a plurality of operand descriptors to address operands required by said program string;

a second plurality of buffer registers to receive, from a value stack in said storage system, the operands referenced by said operand descriptors;

a third plurality of buffer registers to receive from said storage system said descriptors referencing sets of such operand descriptors; and means responsive to the decoding of a program operator calling for a value operand to search said third plurality of buffer registers for a descriptor addressing the set of operand descriptors containing the operand descriptor of the operand called for by said operator.

7. A processor according to claim 6 including:

a fourth plurality of buffer registers to receive descriptors to subsets of said operand descriptors which subset descriptors form base references for addressing individual operand descriptors in said name stack.

8. A processor according to claim 6 including:

a plurality of associative memory registers coupled to each of said first plurality of buffer registers to hold addressing indices for associatively addressing said first plurality of buffer registers.

9. A processor according to claim 6 including:

a fifth plurality of buffer registers to receive from said storage system descriptors which address procedures which may exist concurrently with but are to be executed separately from the current procedure.

10. In an information processing system having a processor to execute a string of program operators and a storage system for storing stacks of information, said stacks including value stacks of operands, name stacks of operand descriptors to address said operands, and stacks of descriptors referencing procedure sets of such name stacks of operand descriptors, said processor including first, second and third pluralities of buffer registers to receive from said storage system, pluralities of operands, corresponding operand descriptors and procedure set descriptors; the method comprising:

scanning said second plurality of buffer registers for the presence of an operand descriptor referencing an operand called for by the decoding of a program operator, fetching said operand from said storage system to said first plurality of buffer registers when the corresponding operand descriptor is not present in said second plurality of buffer registers, scanning said third plurality of buffer registers for the presence of a procedure set descriptor referencing the set of operand descriptors that includes the operand descriptor corresponding to the called operand; and halting the execution of said program operator when said procedure set descriptor is not present in said third set of buffer registers.

* * * * *